United States Patent
Sluijts et al.

(10) Patent No.: US 9,334,349 B2
(45) Date of Patent: May 10, 2016

(54) POLYOLEFIN POLYMERIZATION PROCESS, SEMI-CRYSTALLINE ETHYLENE-BASED POLYMER MADE THEREFROM, AND ARTICLES MADE FROM THE POLYMER

(71) Applicant: Dow Global Technologies LLC, Midland, MI (US)

(72) Inventors: Ludovicus J C Sluijts, Terneuzen (NL); Armanda Van Putten, Tarragona (ES); Ian M. Munro, Houston, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/394,492

(22) PCT Filed: Mar. 14, 2013

(86) PCT No.: PCT/US2013/031190
§ 371 (c)(1),
(2) Date: Oct. 15, 2014

(87) PCT Pub. No.: WO2013/169359
PCT Pub. Date: Nov. 14, 2013

(65) Prior Publication Data
US 2015/0087794 A1    Mar. 26, 2015

Related U.S. Application Data

(60) Provisional application No. 61/644,953, filed on May 9, 2012.

(51) Int. Cl.
*C08F 4/64* (2006.01)
*C08F 210/16* (2006.01)
*C08F 4/642* (2006.01)

(52) U.S. Cl.
CPC ............ *C08F 210/16* (2013.01); *C08F 4/64* (2013.01); *C08F 4/6426* (2013.01); *C08F 4/6428* (2013.01)

(58) Field of Classification Search
CPC ........ C08F 4/60193; C08F 4/52; C08F 4/602; C08F 4/64
USPC .......................................... 526/172, 161, 134
See application file for complete search history.

(56) References Cited

U.S. PATENT DOCUMENTS

| | | | |
|---|---|---|---|
| 4,544,762 A | 10/1985 | Kaminsky et al. | |
| 5,015,749 A | 5/1991 | Schmidt et al. | |
| 5,041,585 A | 8/1991 | Deavenport et al. | |
| 7,528,203 B2 * | 5/2009 | Leclerc | C08F 210/02 526/161 |
| 8,609,794 B2 * | 12/2013 | Klosin | C08F 10/00 502/103 |
| 8,722,819 B2 * | 5/2014 | Robert | C08F 10/00 526/129 |
| 9,045,628 B2 * | 6/2015 | Ewart et al. | |
| 2004/0010103 A1 | 1/2004 | Boussie et al. | |
| 2008/0311812 A1 | 12/2008 | Arriola et al. | |
| 2011/0015346 A1 * | 1/2011 | Hermel-Davidock et al. | . 525/55 |
| 2011/0054122 A1 * | 3/2011 | Klosin et al. | 525/195 |

FOREIGN PATENT DOCUMENTS

| | | |
|---|---|---|
| WO | 2006020624 | 2/2006 |
| WO | 2007136496 | 11/2007 |
| WO | 2007136497 | 11/2007 |
| WO | 2008033197 | 3/2008 |

OTHER PUBLICATIONS

EPO Rules 161(1) and 162 EPC Communication for counterpart EPO Application No. 13711562.2 dated Dec. 16, 2014, 3 pages.
PCT/US2013/031190 International Search Report and Written Opinion dated May 28, 2013, 8 pages.
PCT/US2013/031190 International Preliminary Report on Patentability dated Nov. 20, 2014, 6 pages.
European Response to Communication pursuant to Rules 161(1) and 162 filed Jun. 4, 2015 for counterpart European Application No. 13711562.2, 7 pages.

* cited by examiner

Primary Examiner — Rip A Lee

(57) ABSTRACT

A polymerization process comprising (A) polymerizing ethylene in the presence of a catalyst to form a semi-crystalline ethylene-based polymer in at least one reactor; the catalyst comprising an organometallic catalyst thereby forming an ethylene-based polymer composition in the at least one reactor, wherein the catalyst is a metal complex of a polyvalent aryloxyether corresponding to the formula:

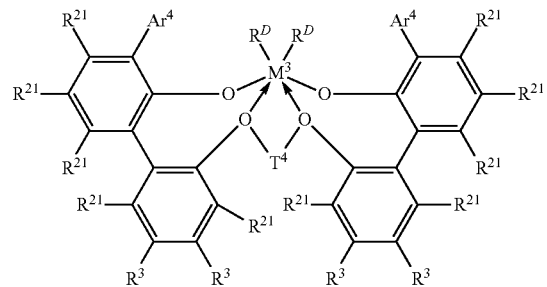

wherein step (A) is conducted in the presence of from 5 to 20 mmol/m$^3$ triethylaluminum; and wherein step (A) is conducted in the presence of one or both of the following conditions: (i) from greater than 0:1 to 65:1 molar ratio of triethylaluminum to the catalyst; and (ii) from 0.1:0 to 5:1 molar ratio of triethylaluminum to modified methylalumoxane is provided.

5 Claims, 2 Drawing Sheets

US 9,334,349 B2

POLYOLEFIN POLYMERIZATION PROCESS, SEMI-CRYSTALLINE ETHYLENE-BASED POLYMER MADE THEREFROM, AND ARTICLES MADE FROM THE POLYMER

FIELD OF INVENTION

The instant invention relates to a polyolefin polymerization process, semi-crystalline ethylene-based polymer made therefrom, and articles made from the polymer.

BACKGROUND OF THE INVENTION

Metallocene-catalyzed polymers have been commercial for several years, and are used in many end-use applications, such as packaging, personal hygiene, automotive, flooring, adhesives, fibers, nonwovens, films, sheets, and fabrics.

Polymerization processes utilizing metallocene catalysts, including constrained geometry catalysts (CGC), to make polyolefin elastomers (POE) and/or polyolefin plastomers (POP) under reaction conditions that give high catalyst efficiency frequently become unstable. Modified methylalumoxane (MMAO3A), an impurity scavenger, is usually added in a fixed ratio to the CGC catalyst, and therefore, only a very small amount of MMAO3A is added under high efficiency, i.e. low catalyst level, conditions. Therefore, any variation in impurity levels in the feed during the polymerization process may cause a loss of reaction.

POE and POP polymerization processes exhibiting stability and/or efficiency over a range of feed impurity would be desirable.

SUMMARY OF THE INVENTION

The instant invention is a polyolefin polymerization process, semi-crystalline ethylene-based polymer made therefrom, and articles made from the polymer.

In one embodiment, the instant invention provides a polymerization process comprising: (A) polymerizing ethylene and optionally one or more α-olefins in the presence of a catalyst to form a semi-crystalline ethylene-based polymer in at least one reactor; the catalyst comprising an organometallic catalyst thereby forming an ethylene-based polymer composition in the at least one reactor, wherein the catalyst is a metal complex of a polyvalent aryloxyether corresponding to the formula:

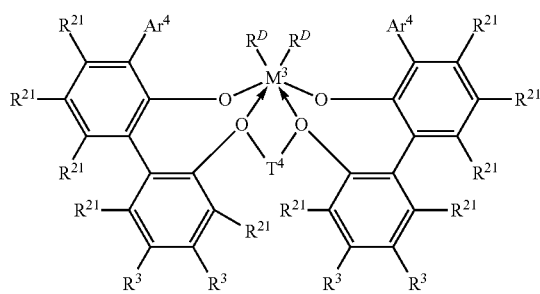

where $M^3$ is Ti, Hf or Zr, preferably Zr; $Ar^4$ is independently in each occurrence a substituted $C_{9-20}$ aryl group, wherein the substituents, independently in each occurrence, are selected from the group consisting of alkyl; cycloalkyl; and aryl groups; and halo-, trihydrocarbylsilyl- and halohydrocarbyl-substituted derivatives thereof, with the proviso that at least one substituent lacks co-planarity with the aryl group to which it is attached; $T^4$ is independently in each occurrence a $C_{2-20}$ alkylene, cycloalkylene or cycloalkenylene group, or an inertly substituted derivative thereof; $R^{21}$ is independently in each occurrence hydrogen, halo, hydrocarbyl, trihydrocarbylsilyl, trihydrocarbylsilylhydrocarbyl, alkoxy or di(hydrocarbyl)amino group of up to 50 atoms not counting hydrogen; $R^3$ is independently in each occurrence hydrogen, halo, hydrocarbyl, trihydrocarbylsilyl, trihydrocarbylsilylhydrocarbyl, alkoxy or amino of up to 50 atoms not counting hydrogen, or two $R^3$ groups on the same arylene ring together or an $R^3$ and an $R^{21}$ group on the same or different arylene ring together form a divalent ligand group attached to the arylene group in two positions or join two different arylene rings together; and $R^D$ is independently in each occurrence halo or a hydrocarbyl or trihydrocarbylsilyl group of up to 20 atoms not counting hydrogen, or 2 $R^D$ groups together are a hydrocarbylene, hydrocarbadiyl, diene, or poly(hydrocarbyl)silylene group; wherein step (A) is conducted in the presence of from 5 to 20 mmol/m$^3$ triethylaluminum; and wherein step (A) is conducted in the presence of one or both of the following conditions: (i) from greater than 0:1 to 65:1 molar ratio of triethylaluminum to the catalyst; and (ii) from 0.1:0 to 5:1 molar ratio of triethylaluminum to modified methylalumoxane.

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

DETAILED DESCRIPTION OF THE INVENTION

Figure 1:
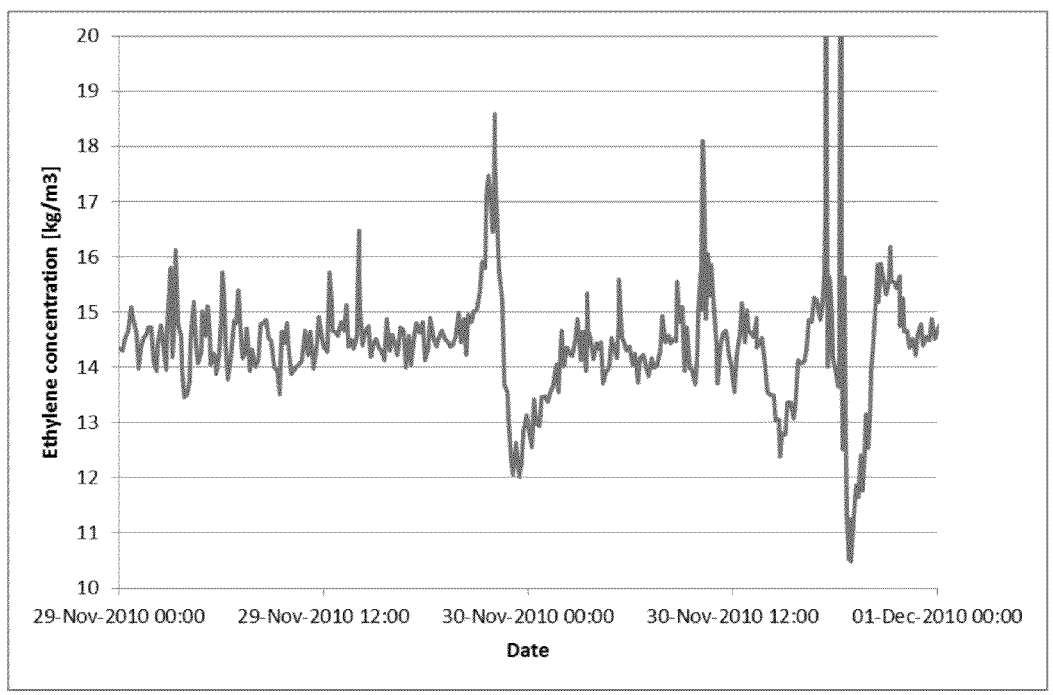
FIG. 1 is a graph illustrating reactor instability with polymerization in the presence of MMAO only.

The instant invention is a polyolefin polymerization process, semi-crystalline ethylene-based polymer made therefrom, and articles made from the polymer.

The polymerization process according to the present invention comprises: (A) polymerizing ethylene and optionally one or more α-olefins in the presence of a catalyst to form a semi-crystalline ethylene-based polymer in at least one reactor; the catalyst comprising an organometallic catalyst thereby forming an ethylene-based polymer composition in the at least one reactor, wherein the catalyst is a metal complex of a polyvalent aryloxyether corresponding to the formula:

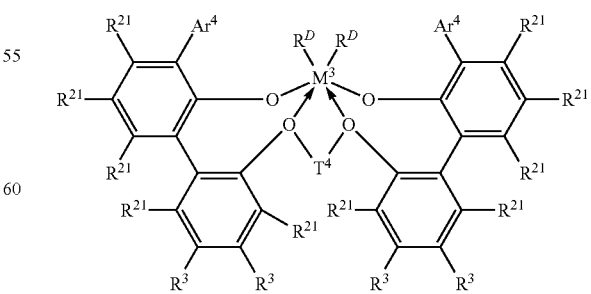

where $M^3$ is Ti, Hf or Zr, preferably Zr; $Ar^4$ is independently in each occurrence a substituted $C_{9-20}$ aryl group, wherein the substituents, independently in each occurrence, are selected from the group consisting of alkyl; cycloalkyl; and aryl groups; and halo-, trihydrocarbylsilyl- and halohydrocarbyl-substituted derivatives thereof, with the proviso that at least one substituent lacks co-planarity with the aryl group to which it is attached; $T^4$ is independently in each occurrence a $C_{2-20}$ alkylene, cycloalkylene or cycloalkenylene group, or an inertly substituted derivative thereof; $R^{21}$ is independently in each occurrence hydrogen, halo, hydrocarbyl, trihydrocarbylsilyl, trihydrocarbylsilylhydrocarbyl, alkoxy or di(hydrocarbyl)amino group of up to 50 atoms not counting hydrogen; $R^3$ is independently in each occurrence hydrogen, halo, hydrocarbyl, trihydrocarbylsilyl, trihydrocarbylsilylhydrocarbyl, alkoxy or amino of up to 50 atoms not counting hydrogen, or two $R^3$ groups on the same arylene ring together or an $R^3$ and an $R^{21}$ group on the same or different arylene ring together form a divalent ligand group attached to the arylene group in two positions or join two different arylene rings together; and $R^D$ is independently in each occurrence halo or a hydrocarbyl or trihydrocarbylsilyl group of up to 20 atoms not counting hydrogen, or 2 $R^D$ groups together are a hydrocarbylene, hydrocarbadiyl, diene, or poly(hydrocarbyl)silylene group; wherein step (A) is conducted in the presence of from 5 to 20 mmol/m$^3$ triethylaluminum; and wherein step (A) is conducted in the presence of one or both of the following conditions: (i) from greater than 0:1 to 65:1 molar ratio of triethylaluminum to the catalyst; and (ii) from 0.1:0 to 5:1 molar ratio of triethylaluminum to modified methylalumoxane.

Such polyvalent aryloxyether metal complexes and their synthesis are described in WO 2007/136496 or WO 2007/136497, using the synthesis procedures disclosed in US-A-2004/0010103. Among the preferred polyvalent aryloxyether metal complexes are those disclosed as example 1 in WO 2007/136496 and as example A10 in WO 2007/136497. Suitable cocatalysts and polymerization conditions for use of the preferred polyvalent aryloxyether metal complexes are also disclosed in WO 2007/136496 or WO 2007/136497.

As used in the present invention, modified methylaluminoxane and triethylaluminum are used solely as impurity scavengers.

A solution-phase polymerization process may be used in certain embodiments of the inventive process. Typically, such a process occurs in a well-mixed reactor such as a loop reactor or a sphere reactor at temperature from about 130 to about 300° C., preferably from about 150 to about 200° C., and at pressures from about 30 to about 1000 psi, preferably from about 30 to about 750 psi. The residence time in such a process is typically from about 2 to about 20 minutes, preferably from about 10 to about 20 minutes. Ethylene, solvent, catalyst, and one or more comonomers are fed continuously to the reactor. Exemplary solvents include, but are not limited to, isoparaffins. For example, such solvents are commercially available under the name ISOPAR E from ExxonMobil Chemical Co., Houston, Tex. The resultant mixture of ethylene-based polymer and solvent is then removed from the reactor and the polymer is isolated. Solvent is typically recovered via a solvent recovery unit, that is, heat exchangers and vapor liquid separator drum, and is recycled back into the polymerization system. In yet other embodiments of the inventive process, the process may proceed in any suitable reactor system, such as slurry polymerization system.

All individual values and subranges from 5 to 20 mmol/m$^3$ triethylaluminum are included herein and disclosed herein; for example, the amount of triethylaluminum present in step (A) can be from a lower limit of 5, 8, 11, 14, 17 or 19 mmol/m$^3$ to an upper limit of 6, 9, 12, 15, 18 or 20 mmol/m$^3$. For example, the amount of triethylaluminum present in step (A) may be in the range of from 5 to 20 mmol/m$^3$, or in the alternative, the amount of triethylaluminum present in step (A) may be in the range of from 10 to 20 mmol/m$^3$, or in the alternative, the amount of triethylaluminum present in step (A) may be in the range of from 5 to 10 mmol/m$^3$, or in the alternative, the amount of triethylaluminum present in step (A) may be in the range of from 8 to 18 mmol/m$^3$, or in the alternative, the amount of triethylaluminum present in step (A) may be in the range of from 9 to 14 mmol/m$^3$.

In an alternative embodiment, the instant invention provides a process, in accordance with any of the preceding embodiments, except that step (A) is conducted in the presence of only one of the following conditions: (i) from greater than 0:1 to 65:1 molar ratio of triethylaluminum to the catalyst; and (ii) from 0.1:0 to 5:1 molar ratio of triethylaluminum to modified methylalumoxane.

In one alternative embodiment, step (A) is conducted solely in the presence of (i) from greater than 0:1 to 65:1 molar ratio of triethylaluminum to the catalyst. In yet another alternative embodiment, step (A) is conducted solely in the presence of (ii) from 0.1:0 to 5:1 molar ratio of triethylaluminum to modified methylalumoxane.

In an alternative embodiment, the instant invention provides a process, in accordance with any of the preceding embodiments, except that step (A) is conducted in the presence of both of the following conditions: (i) from greater than 0:1 to 65:1 molar ratio of triethylaluminum to the catalyst; and (ii) from 0.1:0 to 5:1 molar ratio of triethylaluminum to modified methylalumoxane.

In those embodiments in which step (A) is conducted in the presence of from greater than 0:1 to 65:1 molar ratio of triethylaluminum to the catalyst, all individual values and subranges from 0:1 to 65:1 molar ratio of triethylaluminum to the catalyst are included herein and disclosed herein; for example, the molar ratio of triethylaluminum to the catalyst can be from a lower limit of 0.1:1, 10:1, 20:1, 30:1, 40:1, 50:1, or 60:1 to an upper limit of 5:1, 151, 25:1, 35:1, 45:1, 55:1, or 65:1. For example, the molar ratio of triethylaluminum to the catalyst may be in the range of from 0.1:1 to 65:1, or in the alternative, the molar ratio of triethylaluminum to the catalyst may be in the range of from 10:1 to 50:1, or in the alternative, the molar ratio of triethylaluminum to the catalyst may be in the range of from 0.05:1 to 25:1, or in the alternative, the molar ratio of triethylaluminum to the catalyst may be in the range of from 40:1 to 65:1, or in the alternative, the molar ratio of triethylaluminum to the catalyst may be in the range of from 1:1 to 30:1.

In those embodiments in which step (A) is conducted in the presence of from 0.1:0 to 5:1 molar ratio of triethylaluminum to modified methylalumoxane, all individual values and subranges from 0.1:0 to 5:1 molar ratio of triethylaluminum to modified methylalumoxane are included herein and disclosed herein; for example, the molar ratio of triethylaluminum to modified methylalumoxane can be from a lower limit of 0.1:1, 0.5:1, 1.1:1, 2:1, 3.2:1, 4.5:1, or 4.9:1 to an upper limit of 0.2:1, 0.8:1, 1.5:1, 2.2:1, 3.5:1, 4.7:1 or 5:1. For example, the molar ratio of triethylaluminum to modified methylalumoxane may be in the range of from 0.1:0 to 5:1, or in the alternative, the molar ratio of triethylaluminum to modified methylalumoxane may be in the range of 0.1:0 to 5:1, or in the alternative, the molar ratio of triethylaluminum to modified methylalumoxane may be in the range of from 0:5 to 4.5:1, or in the alternative, the molar ratio of triethylaluminum to modified methylalumoxane may be in the range of from 3.2:1 to 5:1, or in the alternative, the molar ratio of triethylaluminum to modified methylalumoxane may be in the range of from 0.1:1 to 2.8:1.

In one embodiment, the instant invention provides a process, in accordance with any of the preceding embodiments, except that step (A) is conducted in the absence of any modified methylalumoxane and only in the presence of triethylaluminum.

In an alternative embodiment, the instant invention provides a process, in accordance with any of the preceding embodiments, except that the catalyst exhibits a catalyst efficiency from 300 to 15000 kg polymer/g active catalyst metal.

In an alternative embodiment, the instant invention provides a process, in accordance with any of the preceding embodiments, except that the molar ratio of triethylaluminum to modified methylalumoxane is from 1:1 to 2:1.

In an alternative embodiment, the instant invention provides a process, in accordance with any of the preceding embodiments, except that step (A) is conducted in the presence of bis(hydrogenated tallow alkyl)methyl, tetrakis(pentafluorophenyl)borate(1-)amine, wherein the molar ratio of bis(hydrogenated tallow alkyl)methyl, tetrakis(pentafluorophenyl)borate(1-)amine to metal complex of polyvalent aryloxy ether is from 0.1 to 10. All individual values and subranges from 0.1 to 10 are included herein and disclosed herein; for example, the molar ratio of bis(hydrogenated tallow alkyl)methyl, tetrakis(pentafluorophenyl)borate(1-)amine to metal complex of polyvalent aryloxy ether can be from a lower limit of 0.1, 1, 2, 3, 4, 5, 6, 7, 8, or 9 to an upper limit of 0.5, 1.2, 2.3, 3.4, 4.5, 5.6, 6.7, 7.8, 8.9 or 10. For example, the molar ratio of bis(hydrogenated tallow alkyl) methyl, tetrakis(pentafluorophenyl)borate(1-)amine to metal complex of polyvalent aryloxy ether may be in the range of from 0.1 to 10, or in the alternative, the molar ratio of bis(hydrogenated tallow alkyl)methyl, tetrakis(pentafluorophenyl)borate(1-)amine to metal complex of polyvalent aryloxy ether may be in the range of from 1.5 to 5, or in the alternative, the molar ratio of bis(hydrogenated tallow alkyl)methyl, tetrakis(pentafluorophenyl)borate(1-)amine to metal complex of polyvalent aryloxy ether may be in the range of from 5 to 10, or in the alternative, the molar ratio of bis(hydrogenated tallow alkyl)methyl, tetrakis(pentafluorophenyl)borate(1-) amine to metal complex of polyvalent aryloxy ether may be in the range of from 3.5 to 7.5, or in the alternative, the molar ratio of bis(hydrogenated tallow alkyl)methyl, tetrakis(pentafluorophenyl)borate(1-)amine to metal complex of polyvalent aryloxy ether may be in the range of from 0.1 to 3.9.

In an alternative embodiment, the instant invention provides a process, in accordance with any of the preceding embodiments, except that the polymerization process utilizes a first polymerization reactor and a second polymerization reactor, wherein step (A) is conducted in the second polymerization reactor in the presence of freshly supplied ethylene; and further comprising (B) polymerizing ethylene and optionally one or more α-olefins in the presence of a second catalyst to form a semi-crystalline ethylene-based polymer in the first polymerization reactor. The second catalyst may be selected from any known ethylene polymerization catalyst, including for example, single site catalysts, Ziegler-Natta catalysts and combinations thereof.

In another alternative embodiment, the polymerization process is conducted in only one polymerization reactor.

Known metallocene-catalyzed polymers include both (a) the homogeneous-branched, substantially linear ethylene polymers ("SLEP") which are prepared using constrained geometry catalysts ("CGC Catalyst"), such as disclosed in U.S. Pat. No. 5,272,236 and U.S. Pat. No. 5,278,272, and WO93/08221, as well as the homogeneous linear ethylene polymers ("LEP") which are prepared using other metallocene (called "bis-CP catalysts"). Various grades of SLEPs, having a variety of densities and melt flow rates, are commercially available from The Dow Chemical Company as ENGAGE™ polyolefin elastomers or AFFINITY™ plastomers. Various grades of LEPs are commercially available from ExxonMobil Chemical Company as EXACT™ or EXCEED™ polymers.

One technique for preparing such modified aluminoxane (aka alumoxane) is disclosed in U.S. Pat. No. 5,041,584 (Crapo et al.). Aluminoxanes can also be made as disclosed in U.S. Pat. No. 5,542,199 (Lai et al.); U.S. Pat. No. 4,544,762 (Kaminsky et al.); U.S. Pat. No. 5,015,749 (Schmidt et al.); and U.S. Pat. No. 5,041,585 (Deavenport et al.).

In an alternative embodiment, the instant invention further provides a semi-crystalline ethylene-based polymer produced by the polymerization process according to any one of the preceding embodiments. Commercial examples of semi-crystalline, CGC-catalysed ethylene-based plastomers or elastomers include AFFINITY™ polyolefin plastomers and ENGAGE™ polyolefin elastomers, both available from The Dow Chemical Company.

In another alternative embodiment, the instant invention further provides an article comprising the semi-crystalline ethylene-based polymer of according to any one of the preceding embodiments.

EXAMPLES

The following examples illustrate the present invention but are not intended to limit the scope of the invention.

Inventive Example 1 and Comparative Example 1 were a polymerization process to make an ethylene-octene copolymer pursuant to the reactor conditions shown below. In Comparative Example 1, only MMA was added with no TEA. In Inventive Example 1, TEA and MMA were both added to the polymerization process with TEA present at a level of 10 mmol/m$^3$ in the reactor.

Reactor Conditions

Average temperature; 155° C.
Average ethylene concentration: 14.5 kg/m3
Average octene concentration: 145 kg/m3
Average polymer concentration 21.6 wt %
Cocatalys to catalyst molar ratio (B/Zr) 1.8:1
Al (MMAO) to catalyst molar ratio (Al/Zr) between 15:1 and 25:1

Resulting Polymer has the Following Properties:

Density=870 kg/m3
Melt index=0.5 dg/min (controlled by adding hydrogen as chain terminator)

Typical Polymer Yield

Expressed in amount of polymer per amount of active catalyst metal (in this case Zr) for this product and these conditions is between 4.0 and 12 t/g (typically 9 t/g).

Figure 2:
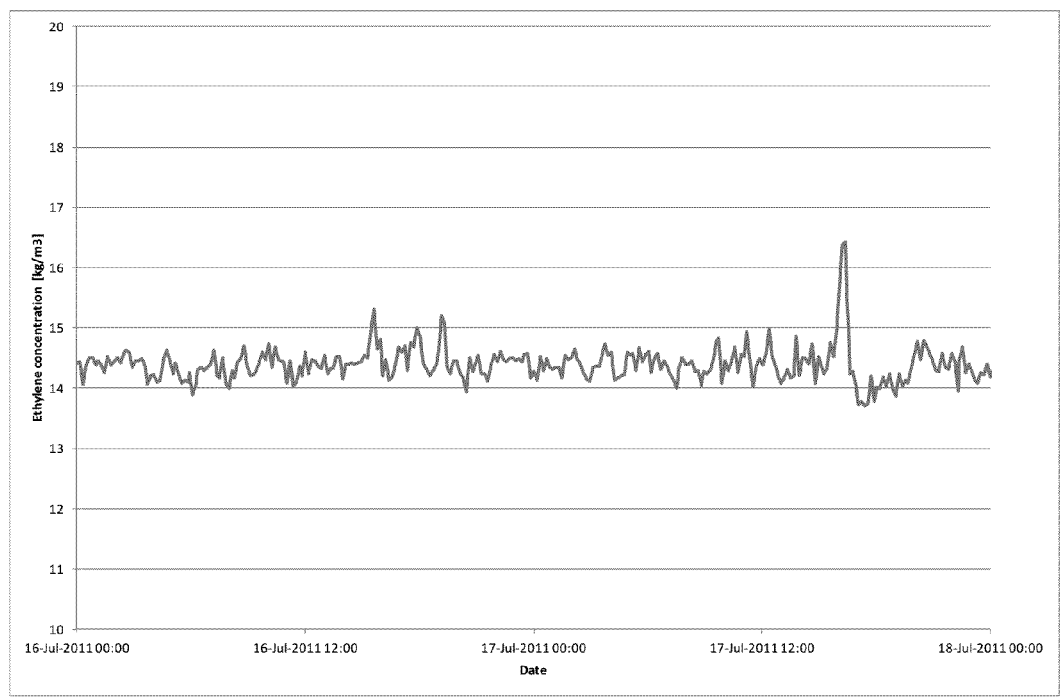
FIG. 2 is a graph illustrating reactor stability with polymerization in the presence of MMAO in combination with 10 mmol/m3 of TEA.

FIG. 1 shows the reactor stability, expressed as measured ethylene concentration, for Comparative Example 1. FIG. 2 shows the reactor stability, expressed as measured ethylene concentration, for Inventive Example 1.

The present invention may be embodied in other forms without departing from the spirit and the essential attributes thereof, and, accordingly, reference should be made to the appended claims, rather than to the foregoing specification, as indicating the scope of the invention.

We claim:

1. A polymerization process comprising:
(A) polymerizing ethylene and optionally one or more α-olefins in the presence of a catalyst to form a semi-crystalline ethylene-based polymer in at least one reactor; the catalyst comprising an organometallic catalyst thereby forming an ethylene-based polymer composition in the at least one reactor, wherein the catalyst is a metal complex of a polyvalent aryloxyether corresponding to the formula:

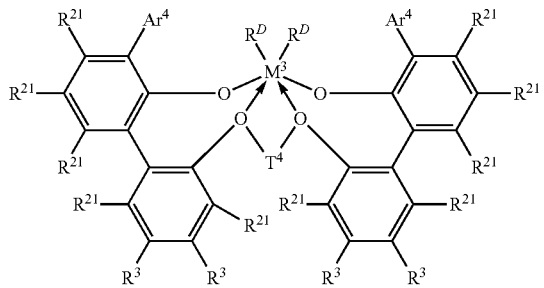

where $M^3$ is Ti, Hf or Zr;

$Ar^4$ is independently in each occurrence a substituted $C_{9-20}$ aryl group, wherein the substituents, independently in each occurrence, are selected from the group consisting of alkyl; cycloalkyl; and aryl groups; and halo-, trihydrocarbylsilyl- and halohydrocarbyl- substituted derivatives thereof, with the proviso that at least one substituent lacks co-planarity with the aryl group to which it is attached;

$T^4$ is independently in each occurrence a $C_{2-20}$ alkylene, cycloalkylene or cycloalkenylene group, or an inertly substituted derivative thereof;

$R^{21}$ is independently in each occurrence hydrogen, halo, hydrocarbyl, trihydrocarbylsilyl, trihydrocarbylsilylhydrocarbyl, alkoxy or di(hydrocarbyl)amino group of up to 50 atoms not counting hydrogen;

$R^3$ is independently in each occurrence hydrogen, halo, hydrocarbyl, trihydrocarbylsilyl, trihydrocarbylsilylhydrocarbyl, alkoxy or amino of up to 50 atoms not counting hydrogen, or two $R^3$ groups on the same arylene ring together or an $R^3$ and an $R^{21}$ group on the same or different arylene ring together form a divalent ligand group attached to the arylene group in two positions or join two different arylene rings together; and $R^D$ is independently in each occurrence halo or a hydrocarbyl or trihydrocarbylsilyl group of up to 20 atoms not counting hydrogen, or 2 $R^D$ groups together are a hydrocarbylene, hydrocarbadiyl, diene, or poly(hydrocarbyl)silylene group;

wherein step (A) is conducted in the presence of from 5 to 20 mmol/m³ triethylaluminum; and wherein step (A) is conducted in the presence of the following conditions: (i) from greater than 0:1 to 65:1 molar ratio of triethylaluminum to the catalyst; and (ii) from 0.1:greater than 0 to 5:1 molar ratio of triethylaluminum to modified methylalumoxane.

2. The polymerization process according to claim 1, wherein the molar ratio of triethylaluminum to modified methylalumoxane is from 1:1 to 2:1.

3. The polymerization process according to claim 1, wherein step (A) is conducted in the presence of bis(hydrogenated tallow alkyl)methyl, tetrakis(pentafluorophenyl)borate(1-)amine and wherein the molar ratio of bis(hydrogenated tallow alkyl)methyl tetrakis(pentafluorophenyl)borate (1-)amine to metal complex of polyvalent aryloxy ether is from 0.1 to 10.

4. The polymerization process according to claim 1, wherein step (A) is conducted in one polymerization reactor.

5. The polymerization process according to claim 1, wherein the polymerization process utilizes a first polymerization reactor and a second polymerization reactor, wherein step (A) is conducted in the second polymerization reactor in the presence of freshly supplied ethylene; and further comprising (B) polymerizing ethylene and optionally one or more α-olefins in the presence of a second catalyst to form a semi-crystalline ethylene-based polymer in the first polymerization reactor.

* * * * *